United States Patent [19]

Nikandrov et al.

[11] 4,300,925

[45] Nov. 17, 1981

[54] GAS PURIFYING FILTER

[76] Inventors: Gennady A. Nikandrov, ulitsa Firsova, 2, kv. 56; Alexandr A. Alovyainikov, ulitsa Firsova, 2, kv. 10; Ljudmila V. Varlamova, ulitsa Chkalova, 8, kv. 30; Alexandr I. Vulikh, ulitsa Firsova, 2, kv. 64; Jury P. Lopatin, ulitsa Uritskogo, 21, kv. 46; Vladimir A. Tikhomirov, Vesennaya ulitsa, 4, kv. 64; Vera A. Chebukhanova, ulitsa Velikanova, 7, korpus 1, kv. 17; Pavel S. Preobrazhensky, ulitsa Firsova 2, kv. 107; Viktor E. Spiridonov, Vysokovoltnaya ulitsa, 31, korpus 2, kv. 27; Alexandr G. Zhelonkin, ulitsa Ostrovskogo, 40, korpus 1, kv. 150; Rudolf P. Varlamov, ulitsa Chkalova, 8, kv. 30, all of Ryazan, U.S.S.R.

[21] Appl. No.: 167,917

[22] Filed: Jul. 11, 1980

[51] Int. Cl.³ .............................................. B01D 46/04
[52] U.S. Cl. ....................................... 55/242; 55/233; 261/106; 261/107
[58] Field of Search .................. 261/106, 107; 55/233, 55/73, 242

[56] References Cited

U.S. PATENT DOCUMENTS

| | | | |
|---|---|---|---|
| 135,806 | 2/1873 | Holmes | 261/106 |
| 1,436,483 | 11/1922 | Cox | 261/106 |
| 1,815,864 | 7/1931 | Patrick | 261/106 |
| 1,913,885 | 6/1933 | Jordahl | 55/233 X |
| 2,535,386 | 12/1950 | Brookins | 261/106 X |
| 3,498,026 | 3/1970 | Messinger et al. | 55/73 |
| 3,815,335 | 6/1974 | Barnebey | 55/242 |

FOREIGN PATENT DOCUMENTS 507334 4/1976 U.S.S.R. .

*Primary Examiner*—Richard L. Chiesa
*Attorney, Agent, or Firm*—Steinberg & Raskin

[57] ABSTRACT

A gas purifying filter comprises a housing provided with gas inlet and outlet stubs arranged on side walls thereof. Rigidly secured inside the housing are stationary filtering elements fabricated from fibrous chemisorbing material in the form of rectangular plates disposed vertically and arranged essentially in parallel with one another. Opposite side edges of the rectangular plates are connected therebetween in pairs by partitions so as to afford an opening for the passage of gas between the plates facing the partition connecting the side edges of a pair of plates. Mounted above the rectangular plates are liquid compartments, the liquid serving to regenerate the filtering elements and being in contact with the upper section of the plates.

4 Claims, 3 Drawing Figures

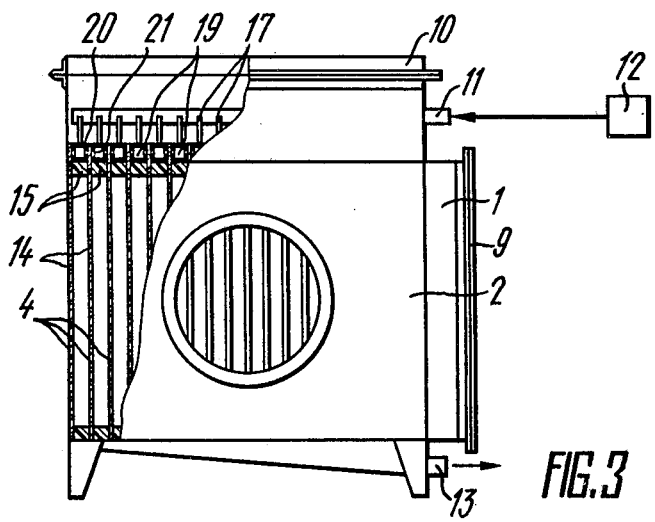

GAS PURIFYING FILTER

FIELD OF THE INVENTION

The present invention relates to apparatus for separating chemically active gaseous substances from gases containing the same, and more particularly to gas purifying filters.

The herein proposed device can be utilized in the metallurgical, machine-building, power-generating and other branches of industry at plants engaged in processing, manufacture, storage of chemicals and in other technological operations, in the course of which toxic gases are liable to emanate into enclosed spaces and surrounding atmosphere, as well as for sanitary purification of the forced, exhaust and recirculating ventilation air and waste gas.

BACKGROUND OF THE INVENTION

Inherent in the plants of various branches of industry wherein it is practically impossible to eliminate the escape of toxic gases into enclosed working spaces and surrounding atmosphere from the plant machinery lacking complete gas-tightness is a problem of sanitary purification of the centralized gas flows through separating toxic gaseous constituents therefrom. Problems like this one can be solved by improved working conditions for the employees, prevention of corrosion of the special-purpose equipment, particularly the costly electronic flow-process control devices, and reduction of the environmental pollution. These problems tend to become more acute with time due to a general increase in the industrial production, more rigid sanitary regulations for industrial gas wastes and for toxic constituents in enclosed spaces of plants. Since it is impossible to find a drastic approach to the problem of ensuring absolute gas-tightness of the equipment or complete automation of the technological processes, a most practicable way of extracting toxic constituent from the ambient air is the purification of the centralized gas flows by means of various equipment arrangements and flow diagrams, enabling the reduction to a certain degree of the level of the gas stream contamination by toxic constituents and to subsequently utilize the substances withdrawn therefrom. The known constructions of filters for separating toxic constituents from gases generally contain the same feature, namely, a removable filtering elements (such as cellular, cartridge, sleeve, foldable, frame and bag filtering elements) adapted to adsorb the toxic constituents to be thereafter extracted from the body of the filter and regenerated in a separate unit. Regeneration is effected by chemisorbtion of the toxic constituents or by replacing used elements by fresh non-regenerable sorbents. Special supports and seals for filtering elements intended to increase gas-tightness and structural rigidity of apparatus make replacement of the elements a labour-consuming operation which, in turn, leads to limited application of such filters for gas purification.

Known in the art is an apparatus for continuous removal of gases (cf. U.S. Pat. No. 3,498,026, Cl. 55–73, published 1970) comprising a housing having inlet and outlet openings for the passage of ambient air. The housing is partitioned into upper and lower chambers. The lower chamber located below the air inlet opening contains a self-sustaining liquid tank unit. Accommodated essentially vertically relative to the housing and inside thereof is a wide movable endless belt, i.e. the filtering element, fabricated from a fibrous chemisorbing material capable of adsorbing unwanted constituents of the ambient air flow, said belt being suspended and guided by a plurality of rollers mounted within the housing on the top and bottom walls thereof. A section of the belt in the upper chamber screens the air inlet providing thereby the removal of unwanted gases. In the lower chamber saturated with unwanted gases a section of the fibrous chemisorbing belt passes through the liquid tank (e.g., hot water) wherein removal of the adsorbed substances and regeneration of the belt material takes place.

The heretofore described apparatus features inefficient utilization of the interior space by chemisorbing material because the filtering element proper is a single chemisorbing belt acting to screen a narrow cross-sectional portion of the apparatus. This substantially reduces specific adsorption of the toxic gases relative to the per unit volume of the apparatus. Also, the apparatus features low ratio between the volume of the chemisorbing material proper and the volume of the regenerating liquid, since in the course of operation the moving chemisorbing belt must be completely immersed into the regenerating liquid tank with sufficient dwell time for contact between the belt and the liquid. This results in an increased specific consumption of the regenerating liquid and low concentration of contaminating substances released thereinto after said liquid leaves the regenerating chamber, which complicates subsequent utilization thereof.

In addition, it is difficult to achieve gas-tightness in various portions of the apparatus with a wide belt continuously moving between the upper and lower chambers, which have different operating conditions.

Also known is an ionic filter for separating agressive substances from gases (cf. USSR Inventor's Certificate No. 507,334, Cl. B 01 d 23/04, published 1976) comprising a housing having openings for inlet of contaminated gas and discharge of the purified gas arranged essentially on the side walls thereof. Rigidly secured inside the housing is a stationary filtering element in the form of a sleeve fabricated from an ion-exchangable fibrous material and mounted with the open end thereof on the inlet opening for the contaminated gas. Arranged at the bottom of the housing is a liquid tank, the liquid acting to regenerate the filtering element. A closed end of the sleeve is secured to the bottom of the tank. In the course of gas purification in the filter, said tank contains no liquid acting to regenerate the filtering element and under combined action of the weight of the tank and a float the ion-exchangable fibrous sleeve remains in a stretched state. Upon saturation of the ion-exchangable fibrous material with toxic gases, the gas inlet opening is closed by a gate so as to prevent the flow of gas through the filter. Thereafter, a regenerating liquid is fed into the lower portion of the housing until the tank and the float are raised to a selected height whereat the sleeve is completely immersed into the regenerating liquid. After a certain dwell time the liquid is drained out of the tank and the filter is ready for further purification.

Owing to the fact that the filtering element is in the form of a sleeve completely immersible into the regenerating liquid, said filter features low fillability of the filter volume with the chemisorbing material resulting in a reduced specific adsorption of the toxic gases per unit volume of the filter and in an increased specific consumption of the regenerating liquid during a single cycle. Furthermore, the operating mode of the heretofore described filter is inherently noncontinuous, requiring to completely discontinue the operation thereof for regeneration of the contaminated filtering element.

SUMMARY OF THE INVENTION

It is therefore an object of the present invention to provide a gas purifying filter, which would afford to increase specific adsorption of the toxic gases per unit volume thereof and to reduce specific consumption of the liquid acting to regenerate the filtering elements.

Another object of the present invention is to provide a gas purifying filter capable of continuous purification of gases without disconnecting the filter from the gas flow for a period required to effect regeneration of the filtering elements.

These objects are attained by that in a gas purifying filter, comprising a housing provided with gas inlet and outlet stubs arranged on side walls of the housing, stationary filtering elements fabricated from fibrous chemisorbing material rigidly secured inside the housing, and liquid compartments for regenerating the filtering elements, the latter being in contact with the liquid, according to the invention, the stationary filtering elements are in the form of rectangular plates positioned vertically inside the housing and arranged in parallel with one another with opposite side edges thereof facing the gas inlet and outlet stubs are connected therebetween in pairs by partitions in such a manner that an opening is formed between the plates for the passage of gas facing the partition connecting the edges of a pair of plates, whereas the liquid compartments are arranged above the plates, the upper sections thereof being in contact with the liquid.

Preferably, the liquid compartments serving to regenerate the filtering elements should be in the form of grooves mounted on the partitions connecting the upper sections of the plates, the upper edges of the plates being folded and the ends thereof lowered into the grooves.

It is also preferable that in order to assure reliable contact of the liquid serving to regenerate the filtering elements with the fibrous material thereof, the compartments be in the form of pipes mounted on the partitions connecting the upper sections of the plates and having in the walls thereof adjoining the surface of the plates holes for feeding the liquid directly to the plate surface.

Utilization of the herein proposed gas purifying filter incorporating fibrous chemisorbing material affords to increase specific adsorption of toxic gases per unit volume of the filter owing to the employment of a great number of the fibrous chemisorbing filtering elements arranged to fully occupy the inner volume of the filter housing and also to reduce specific consumption of the regenerating liquid, since the liquid is introduced into and trickles down exclusively along the material of the filtering elements. Also, the gas purifying filter provides a continuous purification process.

BRIEF DESCRIPTION OF THE DRAWINGS

The heretofore disclosed objects and advantages of the present invention will be readily apparent from a more detailed description of the gas purifying filter and preferred embodiments thereof taken in conjunction with the accompanying drawings, in which:

FIG. 3 is a general view of a gas purifying filter comprising liquid compartments in the form of pipes for regenerating the filtering elements (a front view with partially cut-away wall of the housing on the side of the gas inlet stub), according to the invention.

DETAILED DESCRIPTION OF THE INVENTION

Figure 1:
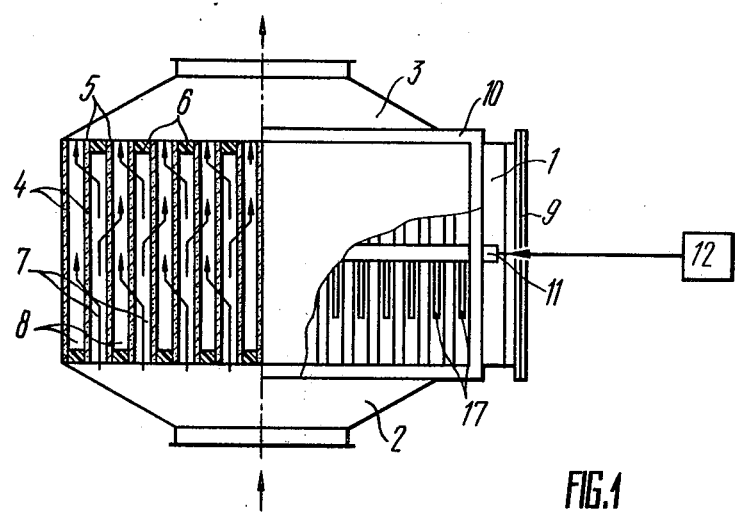
FIG. 1 is a general view of a gas purifying filter (a top plan view with a partial cross-section and partially cut-away wall of the housing), according to the invention.

The proposed gas purifying filter comprises a housing 1 (FIG. 1) having a gas inlet stub 2 and a gas outlet stub 3, both of which are arranged on side walls of the housing 1. Rigidly secured inside the housing 1 between the walls thereof are stationary filtering elements in the form of rectangular plates 4. The plates 4 are arranged vertically in the housing 1 and are fixed in parallel with one another. The rectangular plates 4 are fabricated from a fibrous chemisorbing material capable of chemically adsorbing the toxic constituents from a gas flow and exhibiting sufficient hydrophilic capacity to swell in a liquid acting to regenerate the filtering elements.

Opposite side edges 5 of the plates 4 facing the stubs 2 and 3 for inlet and outlet of the gas flow are connected therebetween in pairs by partitions 6 so as to provide an opening between the plates 4 for the passage of gas opposite the partition 6 connecting the edges 5 of one pair of the plates 4. This connection of the side edges 5 of the plates 4 by the partitions 6 defines alternating inlet chambers 7 and outlet chambers 8 for the passage of gas.

Figure 2:
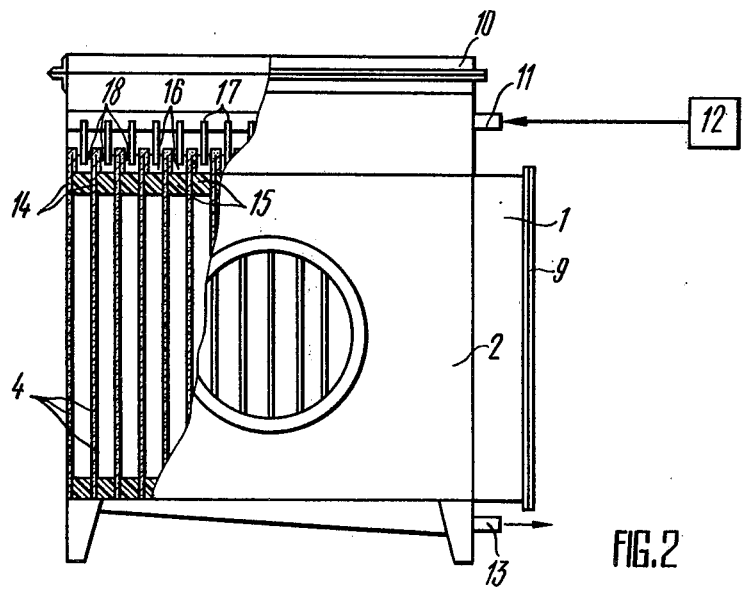
FIG. 2 is a general view of a gas purifying filter comprising liquid compartments in the form of grooves for regenerating the filtering elements (a front view with partially cut-away wall of the housing on the side of the gas inlet stub), according to the invention.

The gas purifying filter also comprises a detachable side cover 9 and a detachable upper cover 10. Arranged in the upper portion of the housing 1 is a pipe 11 for feeding a liquid acting to regenerate the filtering elements, said pipe being connected to an external water supply source 12. The lower portion of the housing 1 incorporates a pipe 13 (FIG. 2) for draining the regenerating liquid.

Contact of the regenerating liquid with the plates 4 in a free space of the housing 1 essentially underlying the upper cover 10 is facilitated by that upper sections 14 of the plates 4 are interconnected by partitions 15 with regenerating liquid compartments being arranged above said partitions. These compartments are in the form of grooves 16 underlying distributors 17, said distributors communicating with the pipe 11 serving to feed the regenerating liquid from the external supply source 12. The upper sections 14 of the plates 4 are folded so as to have ends 18 thereof lowered into the grooves 16.

In another preferred embodiment of the regenerating liquid compartments, the latter are fabricated in the form of rectangular pipes 19 (FIG. 3) mounted on the partitions 15 adapted to connect the upper sections of the plates 4. Side walls 20 of the rectangular pipes 19 are provided with a plurality of holes 21 serving to feed the regenerating liquid directly to the plates 4. The rectangular pipes 19 communicate with the distributors 17 extending from the pipe 11 intended to feed the regenerating liquid from the external supply source 12.

The gas purifying filter operates as follows.

Air, containing toxic gaseous constituents, is admitted through the gas inlet stub 2 (FIG. 1) into the housing 1 and consequently enters the inlet chambers 7 formed by pairs of the fibrous chemisorbing plates 4, the side edges 5 of which facing the gas inlet stub 2 are not connected by the partitions 6. The incoming air is then filtered through the chemisorbing material of the plates 4 with the result that the toxic gaseous constituents contained therein are chemically adsorbed by the chemisorbing material of the plates 4. The thus purified gas flows into the outlet chambers 8 formed by pairs of plates 4, the side edges 5 of which facing the gas outlet stub 3 are not connected by the partitions 6, and further passes through the gas outlet stub 3.

As the chemisorbing material of the plates 4 is saturated with the toxic gaseous constituents, regeneration of the filtering elements, i.e. the plates 4, is effected by either disconnecting the filter from the gas flow or without disconnection thereof. In an embodiment of the present invention, wherein the regenerating liquid compartments are in the form of the grooves 16 (FIG. 2), the regenerating liquid is fed from the external supply source 12 via the pipe 11 into the distributors 17 arranged with the open ends thereof substantially overlying the grooves 16. The regenerating liquid is drawn out of the grooves 16 through upper ends 18 of the plates 4 by virtue of capillary attraction property of the fibrous chemisorbing material of the plates 4 and trickles down the fibrous material of the plates 4 to be thereafter removed from the housing 1 through the drain pipe 13. In another embodiment of the present invention, wherein the regenerating liquid compartments are in the form of rectangular pipes 19 (FIG. 3), the regenerating liquid is fed from the external supply source 12 via the pipe 11 and the distributors 17 into the rectangular pipes 19 wherefrom it further passes through the holes 21 arranged in the side walls 20 of the pipes 19 and enters the chemisorbing material of the plates 4 trickling down therealong to be subsequently removed from the housing 1 through the drain pipe 13.

Thus, the herein proposed apparatus for purifying gases affords to increase the utilization of useful filter volume occupied by the plates of fibrous chemisorbing material and thereby to increase tenfold the specific adsorption of toxic gases per unit volume of the filter, as well as to reduce 4 to 5 times the specific consumption of the regenerating liquid and to provide a continuous operation of the filter without resorting to the disconnection thereof from a gas flow for a period required for regenerating the filtering elements.

What is claimed is:

1. A gas purifying filter, comprising:
    a housing;
    a gas inlet stub arranged on a side wall of the housing;
    a gas outlet stub arranged on a side wall of the housing;
    stationary filtering elements fabricated from fibrous chemisorbing material, said elements constituting rectangular plates formed of said fibrous chemisorbing material and rigidly secured inside said housing, positioned vertically and arranged in parallel with one another, each of said rectangular plates having opposed side edges and an upper section;
    a first plurality of partitions connecting said side edges of alternate adjacent pairs of said rectangular plates therebetween so as to provide an opening for the passage of gas between the plates essentially opposite the partition connecting said side edges of an adjacent pair of said rectangular plates; and
    liquid compartments overlying said rectangular plates, the liquid serving to regenerate said stationary filtering elements, each of said compartments defining a space communicating with said upper sections of said fibrous plates and such that the liquid directed into said compartments contacts only said upper sections of said rectangular fibrous plates.

2. A gas purifying filter as defined in claim 1, comprising:
    a second plurality of partitions interconnecting said upper sections of said rectangular plates so that upper portions thereof, extend upwardly beyond said second plurality of partitions; said liquid compartments being in the form of grooves defined by said partitions of said second plurality and said upper portions of said upper plate sections, the liquid serving to regenerate said stationary filtering elements; and
    said upper sections of the rectangular plates having the ends thereof folded so as to extend into said grooves.

3. A gas purifying filter as defined in claim 1, comprising:
    a second plurality of partitions interconnecting said upper sections of said rectangular plates so that upper portions thereof extend upwardly beyond said second plurality of partitions; said liquid compartments being in the form of pipes mounted on said partitions of said second plurality, the pipes having walls adjoining the surfaces of said upper portions of said upper sections of said rectangular fibrous plates, the liquid serving to regenerate said stationary filtering elements; and
    a plurality of holes arranged in said walls of the pipes serving to feed the regenerating liquid directly to the surfaces of said upper portions of said upper sections of said fibrous rectangular plates.

4. A gas purifying filter as defined in claim 1 wherein each of said compartments defines a space which communicates with the respective upper sections of a pair of adjacent fibrous plates such that the liquid directed into each said compartment contacts only said upper sections of a respective pair of adjacent fibrous plates.

* * * * *